United States Patent [19]
Dunder

[11] Patent Number: 6,019,949
[45] Date of Patent: Feb. 1, 2000

[54] OZONE GENERATOR CONTROL SYSTEM

[76] Inventor: Ove Karl Dunder, 2140 Winston Park Dr., Unit 28, Oakville, Ontario, Canada, L6H 5V5

[21] Appl. No.: 09/072,552

[22] Filed: May 5, 1998

Related U.S. Application Data
[60] Provisional application No. 60/045,533, May 5, 1997.

[51] Int. Cl.[7] .............................. B01J 19/08; B01J 19/12
[52] U.S. Cl. ................................................ 422/186.07
[58] Field of Search ..................... 422/186.07, 186.15, 422/186.16, 186.28

[56] References Cited

U.S. PATENT DOCUMENTS

| | | | |
|---|---|---|---|
| 4,682,266 | 3/1987 | Huynh et al. ........................ | 361/235 |
| 4,713,220 | 12/1987 | Huynh et al. ....................... | 422/186.16 |
| 4,752,866 | 6/1988 | Huynh et al. ........................ | 363/138 |
| 5,501,844 | 3/1996 | Kasting, Jr. et al. ............... | 422/186.15 |
| 5,540,898 | 7/1996 | Davidson ........................... | 422/186.15 |
| 5,845,488 | 12/1998 | Hancock et al. ..................... | 60/275 |

*Primary Examiner*—Kathryn Gorgos
*Assistant Examiner*—Wesley A. Nicolas
*Attorney, Agent, or Firm*—Eugene J.A. Gierczak

[57] ABSTRACT

An ozone generator control circuit comprising corona discharge, circuitry to electrically control a regulator voltage applied to a pulse generating device for a corona discharge; circuitry to electrically control the frequency of the pulses applied to the pulse generator for the corona discharge. The electrical control circuit is optically isolated from the pulse generating circuit.

12 Claims, 1 Drawing Sheet

OZONE GENERATOR CONTROL SYSTEM

This application claims the priority of U.S. Provisional Application Ser. No. 60/045,533, filed May 5, 1997.

FIELD OF INVENTION

This invention relates to improvements in the control of ozone production in ozone generators using the corona discharge principle.

BACKGROUND OF INVENTION

When ozone generators are used for medical purposes, it is necessary to control the ozone concentration precisely.

It is common that ozone generators heretofore known, based on the corona discharge principle, use variacs to regulate the amplitude of the alternating current high voltage across the electrodes of the ozone generator. Variacs have the disadvantage that they need to be adjusted by mechanical means.

One method to control the amount of ozone produced by ozone generators, based on the corona discharge principle, use triacs and silicon controlled rectifiers to regulate the amount of ozone used in the ozone generator. It is however not possible to vary the phase angle to the gate of such triacs in small increments in an accurate manner.

Another method to control the amount of ozone produced by ozone generators, based on the corona discharge principle, is to vary the frequency of the voltage pulses applied to the electrodes. This method gives a more reproducible control with better resolution than the amplitude and phase control circuits. The disadvantage is that the control is only effective over a limited frequency range because of the inherent characteristics of the high voltage transformer.

It is common in ozone generator control systems heretofore known that the control means are electrically connected to the ozone generation means through electrical conductors. The noise from the high voltage ozone generation means therefore interferes with the reliable operation of the control means.

Many ozone generator control systems using the above described control methods therefore suffer from a number of disadvantages:

(a) In the ozone generator control systems that use variacs to regulate the amplitude of the alternating current high voltage across the electrodes of the ozone generator, it is necessary to use mechanical means for the adjustment. This is a disadvantage when electronic controls are use.

(b) When triacs and silicon controlled rectifiers are used to regulate the amount of ozone used in the ozone generator, it is not possible to vary the phase angle to the gate of such triacs in small increments in an accurate manner.

(c) In the ozone generator control systems where the frequency of the voltage pulses applied to the electrodes is varied, the control is only effective over a limited frequency range because of the inherent characteristics of the high voltage transformer.

(d) The noise from the high voltage ozone generation means interferes with the reliable operation of the control means in ozone generator control systems where the control means are electrically connected to the ozone generation means through electrical conductors.

OBJECTS AND ADVANTAGES

Accordingly several objects and advantages of the present invention are:

(a) to provide an ozone generator control system which uses electronic means for the control of the production of ozone in an ozone generator.

(b) to provide an ozone generator control system which can adjust the amount of ozone produced accurately in small increments.

(c) to provide an ozone generator control system which can adjust the amount of ozone produced accurately over the full range of ozone production.

(d) to provide an ozone generator control system which is electrically isolated from the noise interference from the high voltage ozone generation means.

BRIEF DESCRIPTION OF THE DRAWINGS

In drawings which illustrate embodiments of the invention.

REFERENCE NUMERALS IN DRAWINGS

Figure 1:
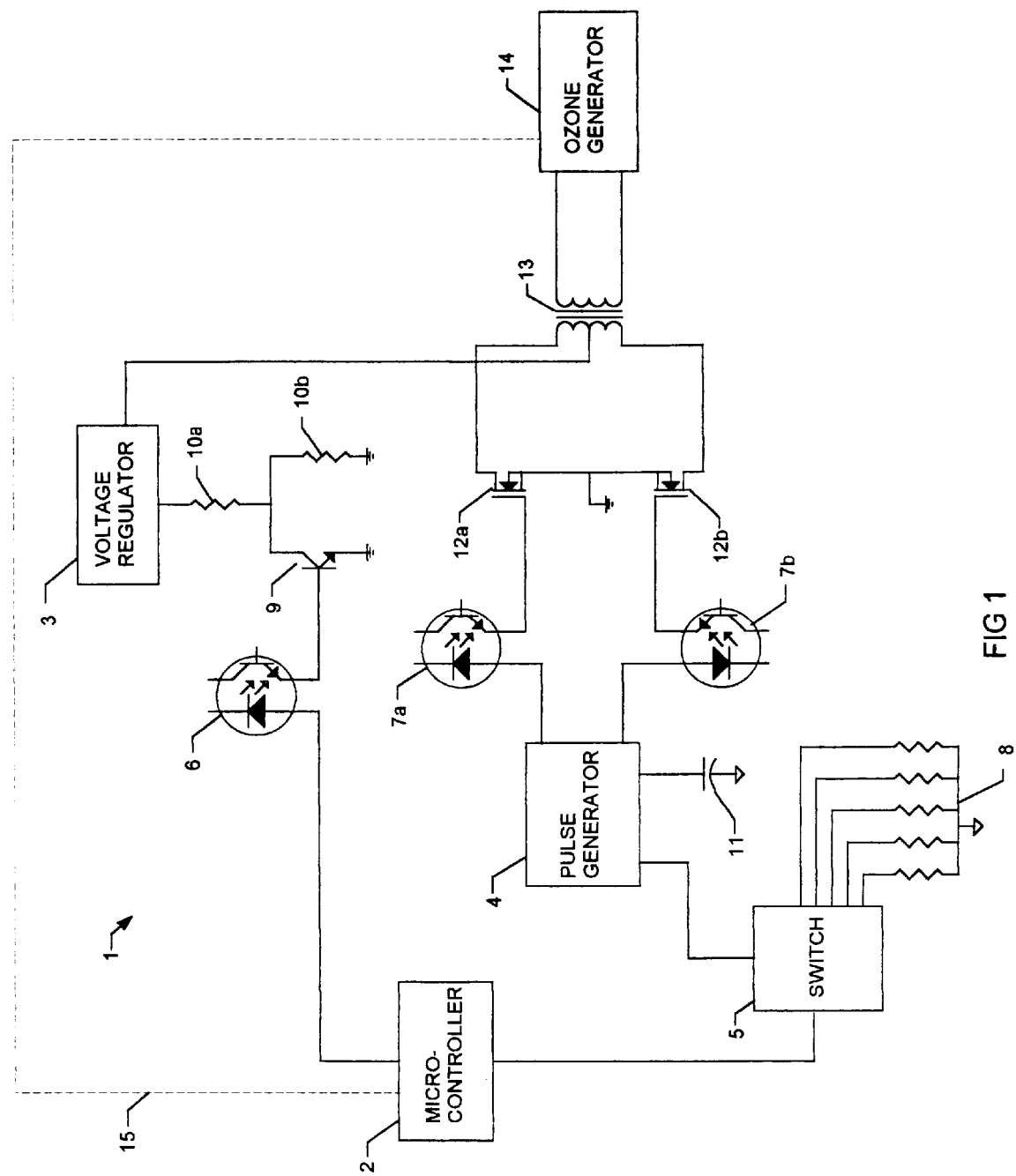
FIG. 1 is a schematic drawing showing the interconnections to the Microcontroller, Pulse Generator, Voltage Regulator and the Ozone Generator.

| 1 | Ozone Generator Control System | 8 | Resistor Network |
| 2 | Microcontroller | 9 | Transistor |
| 3 | Voltage Regulator | 10a | Resistor |
| 4 | Pulse Generator | 10b | Resistor |
| 5 | Switch | 11 | Capacitor |
| 6 | Optocoupler | 12a | MOSFET |
| 7a | Optoisolator | 12b | MOSFET |
| 7b | Optoisolator | 13 | Transformer |
|   |   | 14 | Ozone Generator |
|   |   | 15 | Ozone Sensor Input |

SUMMARY OF INVENTION

A microcontroller controls the ozone production with electrically conducted signals. An analog signal controls a voltage regulator and the regulated voltage output from voltage regulator determines the peak voltage of the pulses applied to the ozone generator. The ozone production is proportional to the amplitude of the applied pulses.

Digital control signals control the frequency of the complementary square wave output from a pulse generator. The ozone production is proportional to the frequency of the applied pulses.

Noise from the high voltage circuit is isolated from the low voltage control circuit through optical isolation.

The ozone production can be accurately controlled over a wide range by adjusting the regulated output voltage in combination with switching the frequency range of the drive pulses applied to the ozone generator.

DETAILED DESCRIPTION OF PREFERRED EMBODIMENT—FIG. 1

The ozone generator control system 1 illustrated comprises a microcontroller 2, a pulse generator 4, a switch 5, a voltage regulator 3, a transformer 13, an ozone generator 14, and electronic components 6, 7a, 7b, 8, 9, 10a, 10b, 11, 12a, 12b.

The microcontroller 2 has two control line outputs and one sensor input. One line controls the selection of a resistor from resistor network 8 and the other line controls the analog voltage level applied to optoisolator 6. The input line 15 from the ozone sensor monitors the ozone concentration in ozone generator 14.

The pulse generator 4 generates a complementary square wave output to optoisolators 7a and 7b. The frequency of the square wave is controlled by the RC time constant of capacitor 11 and the selected resistor in resistor network 8.

The voltage regulator 3 supplies a regulated voltage to the center tap of transformer 13. In the preferred embodiment as shown in FIG. 1 the range of the regulated voltage is 65 to 120 VDC. However the regulated voltage range can have other values, the silent corona discharge gap and the transformer design being two of the design parameters. The regulated voltage level is controlled with transistor 9. The conductance of transistor 9 depends on the supply current to its base from optocoupler 6.

The optoisolators described herein can be described as an optical coupler which can consist of an LED input optically coupled to a photocell. The photocell resistance of optoisolators 7a and 7b is high when the LED current is "off" and low resistance when the LED current is "on". In optocoupler 6 the photo transistor produces an output signal that varies linearly with the LED current.

The transformer 13 is supplied with regulated voltage to its center tapped primary winding from voltage regulator 3. The primary winding is connected to two MOSFETS 12a and 12b in a push-pull power amplifier configuration. The gates of the MOSFETS are controlled by optoisolators 7a and 7b. Other power amplifier configuration can be used with the invention to achieve similar results.

The ozone generator 14 receives high voltage pulses from transformer 13. The intensity of the silent corona discharge inside the ozone generator is proportional to the amplitude and frequency of the high voltage pulses.

From the description above, a number of advantages of the ozone generator control system are observed:

(a) The ozone generator control system uses only electronic means for the control of the production of ozone in the ozone generator.
(b) The ozone generator control system adjusts the amount of ozone produced accurately in small increments.
(c) The ozone generator control system adjusts the amount of ozone produced accurately over the full range of ozone production.
(d) The ozone generator control system is electrically isolated from the noise interference from the high voltage ozone generation means, by means of optoisolators 6, 7a and 7b.

The circuitry described herein and particularly the microcontroller 2 which controls the frequency levels of the applied pulses, can regulate the voltage levels according to a difference signal between a sensor sensing ozone concentrations in the ozone generator 17 and a preset required level.

Operation—FIG. 1

The microcontroller 2 controls the ozone production with two output lines. One line conducts an analog signal which is coupled through an optocoupler 6 to the base of the transistor 9. Transistor 9 is connected in parallel with resistor 10b and will bypass resistor 10b more or less in proportion to the analog drive signal from the microcontroller 2 resulting in a varied resistance seen by voltage regulator 3 through resistor 10a. The regulated voltage output from voltage regulator 3 is directly proportional to the resistance seen through resistor 10a.

The regulated voltage from voltage regulator 3 is connected to the center tap of transformer 13. The peak voltage of the pulses in the primary of transformer 13 therefore equals the regulated voltage. In the preferred embodiment, as shown in FIG. 1, the peak of voltage of the pulses are stepped up from a range of 65 to 120 V to a range of 3,000 to 6,000 V and applied to ozone generator 14. The intensity of the silent corona discharge in ozone generator 14 is proportional to the amplitude of the applied pulses. The ozone production is proportional to the intensity of the silent corona discharge and it is consequently proportional to amplitude of the applied pulses.

The other line from microcontroller 2 conducts digital control signals that controls switch 5, which selects one of the resistors in resistor network 8. Pulse generator 4 has an internal oscillator with a frequency set by the RC time constant of capacitor 11 and the selected resistor in network 8. The frequency of the complementary square wave output from pulse generator 4 is therefore controlled by the value of the selected resistor in network 8. The square wave output from pulse generator 4 is applied to the gates of metal oxide semiconductor field effect transistors (MOSFET) 12a and 12b through optoisolators 7a and 7b. The MOSFETs 12a and 12b forms a push-pull power supply circuit which generates a square wave in the primary winding of transformer 13 and the secondary winding of transformer 13 is applied to ozone generator 14. The intensity of the silent corona discharge in ozone generator 14 is directly proportional to the frequency of the applied pulses. The ozone production is proportional to the intensity of the silent corona discharge and it is consequently directly proportional to frequency of the applied pulses.

Noise from the high voltage circuit is isolated from the low voltage control circuit through optoisolators 7a and 7b and optocoupler 6.

Input line 15 from an appropriate ozone sensor associated with ozone generator 14 monitors the ozone concentration and is used to control the frequency and regulated voltage applied to ozone generator 14.

The ozone production can be accurately controlled over a range of 8% to 100% of capacity by adjusting the output voltage from voltage regulator 3 at a constant frequency of output pulses from pulse generator 4. The resistor network 8 in the preferred embodiment has 5 resistors with different resistance values. For a selection of resistance values of the resistors in resistor network 8 such that the frequency of the output pulses in pulse generator 4 is set at 100 Hz for the highest resistor value and increases with 100 Hz for each selection of a resistor with a lower resistance value; the range of the ozone production is increased by a factor of 5 at the low end to 1.6% to 100%. The range of resistors in the resistor network can be increased for an even greater range of control.

Although the preferred embodiment as well as the operation and use have been specifically described in relation to the drawings, it should be understood that variations in the preferred embodiment could be achieved by a person skilled in the trade without departing from the spirit of the invention as claimed herein.

I claim:

1. An ozone generator control circuit comprising:
(a) a corona discharge means,
(b) means to electrically control the regulated voltage applied to pulse generating means for said corona discharge means,
(c) means to electrically control the frequency of the pulses applied to the pulse generating means for said corona discharge means,
(d) said control means having a control signal optically isolated from said pulse generating means so as to control the frequency and amplitude of said pulse generating means.

2. The ozone generator control circuit of claim 1 wherein said means to electrically control the regulated voltage applied to the pulse generating means for a corona discharge means, is optically isolated from said pulse generating means.

3. An ozone generator control circuit as claimed in claim 2 wherein said means to electrically control the frequency of the pulses applied to the pulse generating means for a corona discharge means is optically isolated from said pulse generating means.

4. The ozone generator control circuit of claim 1 wherein said means to electrically control the frequency of the pulses applied to the pulse generating means for a corona discharge means, is optically isolated said pulse generating means.

5. The ozone generator control circuit of claim 1 wherein said means to electrically control the regulated voltage applied to the pulse generating means for a corona discharge means, regulates the voltage levels in the range of 60 to 250 VDC.

6. The ozone generator control circuit of claim 1 wherein said means to electrically control the frequency of the pulses applied to the pulse generating means for a corona discharge means, controls the frequency in the range of 100 to 1000 Hz.

7. The ozone generator control circuit of claim 1 wherein said means to electrically control the regulated voltage applied to the pulse generating means for a corona discharge means, regulates the voltage levels according to a difference signal between a means to sense ozone concentration and a preset required level.

8. The ozone generator control circuit of claim 1 wherein said means to electrically control the frequency of the pulses applied to the pulse generating means for a corona discharge means, controls the frequency levels according to a difference signal between a means to sense ozone concentration and a preset required level.

9. An ozone sensor circuit comprising:
 (a) a corona discharge means,
 (b) means to electrically control the regulated voltage applied to pulse generating means for generating a high voltage for said corona discharge means,
 (c) means to electrically control the frequency of the pulses applied to said pulse generating means for generating a high voltage for said corona discharge means,
 (d) means to optically isolate the electrical control means from said pulse generating means so as to control the frequency and amplitude of said pulse generating means,
 (e) means to sense ozone concentrations in said corona discharge means,
 (f) wherein said voltage and frequency levels are regulated by said control means according to a difference signal between said ozone sensing means and a preset level.

10. An ozone sensor circuit as claimed in claim 9 wherein said means to electrically control said regulated voltage applied to said pulse generating means includes a microcontroller.

11. An ozone sensor circuit as claimed in claim 9 wherein said means to control said frequency of said pulses applied to said pulse generating means includes a microcontroller.

12. An ozone sensor circuit as claimed in claim 9 wherein said control means have a control signal optically isolated from said pulse generating means.

* * * * *